US012374229B2

(12) United States Patent
J et al.

(10) Patent No.: US 12,374,229 B2
(45) Date of Patent: Jul. 29, 2025

(54) SYSTEMS AND METHODS FOR A VEHICLE PROCESSING SYSTEM WITH A FOG-BASED FRAMEWORK

(71) Applicant: Honeywell International Inc., Charlotte, NC (US)

(72) Inventors: Kirupakar J, Madurai (IN); Angelo Koutsogiannis, Gilbert, AZ (US); Kalimulla Khan, Bangalore (IN); Ramkumar Rajendran, Madurai (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 280 days.

(21) Appl. No.: 18/153,884

(22) Filed: Jan. 12, 2023

(65) Prior Publication Data

US 2024/0112584 A1 Apr. 4, 2024

(30) Foreign Application Priority Data

Sep. 30, 2022 (IN) ............................. 202211056302

(51) Int. Cl.
*G08G 5/26* (2025.01)
*G08G 5/22* (2025.01)

(52) U.S. Cl.
CPC ................. *G08G 5/26* (2025.01); *G08G 5/22* (2025.01)

(58) Field of Classification Search
None
See application file for complete search history.

(56) References Cited

U.S. PATENT DOCUMENTS

2019/0385465 A1* 12/2019 Parker ...................... G08G 5/25
2021/0134162 A1* 5/2021 Sundaramurthy ..... B64U 20/80
2021/0375142 A1* 12/2021 Mueller ............... G08G 5/0052

* cited by examiner

*Primary Examiner* — James J Lee
*Assistant Examiner* — Jonathan E Reinert
(74) *Attorney, Agent, or Firm* — ALSTON & BIRD LLP

(57) ABSTRACT

Disclosed are methods, systems, and one or more computer-readable mediums for performing, by one or more processors located off-board a vehicle, operations including receiving, by the fog based application framework before transit of the vehicle, vehicle operation data from a cloud based database of a cloud based computing system; receiving, by the fog based application framework before and/or in real-time during transit of the vehicle, edge-based vehicle data from one or more edge computing devices of the vehicle; and generating, by the fog based application framework during transit of the vehicle, a plurality of vehicle operation insights based on the vehicle operation data and the edge-based vehicle data.

17 Claims, 9 Drawing Sheets

610

| MODE | ASPECT | CLOUD | FOG IN AIRCRAFT | ITEMS / EXAMPLES |
|---|---|---|---|---|
| CONNECTED - ACTIVE SYNC | COMPUTATION | BIG DATA ANALYSIS OF ALL LIVE FEEDS COMING FROM VARIOUS SOURCES ON INFORMATION LIKE NOTAM, WXR, DATIS, OTHER FLIGHT INFORMATION | RECEIVE LIVE ADVISORIES FROM CLOUD. | DATABASE / ML MODELS |
| CONNECTED - STORE DATA FOR FUTURE | STORE INFORMATION FOR LATER USAGE | INSIGHTS NEEDED AT LATER POINT OF TIME DURING FLIGHT SAY FOR ANOTHER 100 NM/30 MINS OF FLIGHT TIME DOWN THE LINE. | STORE/BUFFER FUTURE DATA FOR LATER USE INCASE OF CONNECTIVITY LOSS TO CLOUD | WEATHER INFORMATION<br>ALTERNATE AIRPORTS ETC |
| DISCONNECTED - OFFLINE | COMPUTATION | NA | SCALED DOWN COMPUTATION WITH RESPECT TO MY CURRENT AC STATE ALONE. | COMPUTE ALTERNATE EMERGENCY DIVERSION PATHS FOR A DISTANCE OF 50NM ALONE. |

*FIG. 7*

SYSTEMS AND METHODS FOR A VEHICLE PROCESSING SYSTEM WITH A FOG-BASED FRAMEWORK

CROSS-REFERENCE TO RELATED APPLICATION(S)

This application claims the benefit of priority to Indian Provisional Patent Application No. 202211056302, filed Sep. 30, 2022, the entirety of which is incorporated by reference herein.

TECHNICAL FIELD

Various embodiments of the present disclosure relate generally to systems and methods for distributed vehicle processing.

BACKGROUND

Application developers creating products targeted to interface with avionics systems have a multidimensional problem to solve. They must understand security requirements. They must also understand the complexity of interfacing with avionics devices and cloud-based services. Developers must also understand subscription and licensing details. They must also gain access to all the required software development kits (SDKs), and properly integrate them into their application.

Moreover, data analytics in avionics has typically been restricted to post-flight analysis due to inaccessibility of data during flight. For instance, most of post-flight analysis relies on recorded flight data that is limited due to storage and connectivity restrictions. Any related insights generated as part of post-flight analysis can take days before being incorporated into flight operations. This post-flight delay leads unnecessarily to persistent inefficiencies and safety anomalies.

The present disclosure is directed to overcoming one or more of these above-referenced challenges.

SUMMARY OF THE DISCLOSURE

According to certain aspects of the disclosure, systems and methods are disclosed for using an integrated networked computing system comprising a fog based application framework comprising a plurality of application engines and a software development kit (SDK) framework. The method can include performing, by one or more processors, operations which include receiving, by the fog based application framework before transit of the vehicle, vehicle operation data from a cloud based database of a cloud based computing system; receiving, by the fog based application framework before and/or in real-time during transit of the vehicle, edge-based vehicle data from one or more edge computing devices of the vehicle; and generating, by the fog based application framework during transit of the vehicle, a plurality of vehicle operation insights based on the vehicle operation data and the edge-based vehicle data.

In some aspects, the one or more operations of the vehicle include an estimated time and/or an estimated efficient flight path of the vehicle to a destination.

In some aspects, the operations include generating, after completion of a first operation associated with vehicle transit, a vehicle operation update related to a second operation of vehicle transit.

In some aspects, the plurality of vehicle operation insights include one or more safety insights, efficiency insights, and/or vehicle operation automation insights.

In some aspects, the step of generating, by the fog based application framework during transit of the vehicle, the plurality of vehicle operation insights is performed when disconnected from the cloud based database, the method further including upon establishing connectivity between the fog based application framework and the cloud based database, pushing, by the fog based application framework, vehicle operation data and/or the plurality of vehicle operation insights to a data lake of the cloud based computing system.

In some aspects, the vehicle is an aircraft and transit is performed during flight operations.

In some aspects, the operations include managing, by a fog based manager of the fog based application framework, all requests from one or more third party applications external to the fog based application framework.

In some aspects, the operations include using a fog service mesh as a bridge between the fog based manager and a data tier and/or an application tier, wherein the application tier includes a fog application gateway in communication with one or more data operation engines; and segregating, by the fog service mesh, vehicle operation requests and routing the segregated vehicle operation requests to the one or more data operation engines.

In some aspects, the operations include connecting the data tier with a plurality of vehicle subsystems of the one or more edge computing devices; and pulling real time data to the fog based manager of the fog based application framework to generate vehicle operation insights.

In some aspects, the operations include receiving, during an active sync mode between the fog based application framework and the cloud based computing system, a plurality of vehicle operation advisories from the cloud based computing system In some aspects, the vehicle operation advisories are determined using a machine learning model of the cloud based computing system, the vehicle operation advisories including for one or more fault conditions, event conditions, and/or anomalies of flight operations, the machine learning model having been generated by processing the edge-based vehicle data.

In some aspects, the operations include storing, in a database of the fog based application framework, a plurality of vehicle operation advisories received, during a store data connected mode from the cloud-based computing system, the plurality of vehicle operation advisories being configured for future vehicle operations in case of vehicle losing connectivity with the cloud based computing system.

In some aspects, the operations include causing, by the fog based application framework, updated vehicle operations based on the plurality of vehicle operation advisories during connectivity loss with the cloud based computing system.

In some aspects, during a disconnected offline mode, the step of generating, by the fog based application framework during transit of the vehicle, the plurality of vehicle operation insights is based on the edge-based vehicle data including onboard safety analytics, efficiency advisories, the method further including identifying and storing all operation events including one or more anomalies.

A system for optimizing operations of a vehicle include a memory storing instructions and one or more processors and configured to execute the stored instructions to perform operations of the vehicle. The operations can include receiving, by a fog based application framework before transit of the vehicle, vehicle operation data from a cloud based database of a cloud based computing system; receiving, by the fog based application framework before and/or in real-time during transit of the vehicle, edge-based vehicle data from one or more edge computing devices of the vehicle; and generating, by the fog based application framework during transit of the vehicle, a plurality of vehicle operation insights based on the vehicle operation data and the edge-based vehicle data.

In some aspects, wherein the step of generating, by the fog based application framework during transit of the vehicle, the plurality of vehicle operation insights is performed when disconnected from the cloud based database, the method further including upon establishing connectivity between the fog based application framework and the cloud based database, pushing, by the fog based application framework, vehicle operation data and/or the plurality of vehicle operation insights to a data lake of the cloud based computing system.

In some aspects, the operations include managing, by a fog based manager of the fog based application framework, all requests from one or more third party applications external to the fog based application framework; using a fog service mesh as a bridge between the fog based manager and a data tier and/or an application tier, wherein the application tier includes a fog application gateway in communication with one or more data operation engines; and segregating, by the fog service mesh, vehicle operation requests and routing the segregated vehicle operation requests to the one or more data operation engines.

In some aspects, the operations include connecting the data tier with a plurality of avionics subsystems; and pulling real time data to the fog based manager of the fog based application framework to generate vehicle operation insights.

In some aspects, a non-transitory computer-readable medium storing instructions, that when executed by at least one processor, perform a method for optimizing one or more vehicle operations of a vehicle, the method including receiving, by a fog based application framework before transit of the vehicle, vehicle operation data from a cloud based database of a cloud based computing system; receiving, by the fog based application framework before and/or in real-time during transit of the vehicle, edge-based vehicle data from one or more edge computing devices of the vehicle; and generating, by the fog based application framework during transit of the vehicle, a plurality of vehicle operation insights based on the vehicle operation data and the edge-based vehicle data.

In some aspects, the method includes pulling a plurality of configuration files related to vehicle operations before leaving an origin when the fog based application framework is connected to the cloud based computing system; pulling a vehicle operation plan from the one or more edge computing devices of the vehicle; assessing the vehicle operation plan for one or more shortcut opportunities; and determining whether any of the one or more shortcut opportunities conflict with detected environmental information from the one or more edge computing devices and/or the cloud based computing system.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 7 is a table summarizing example operational scenarios of an exemplary fog-based framework of this disclosure.

DETAILED DESCRIPTION OF EMBODIMENTS

Figure 1:
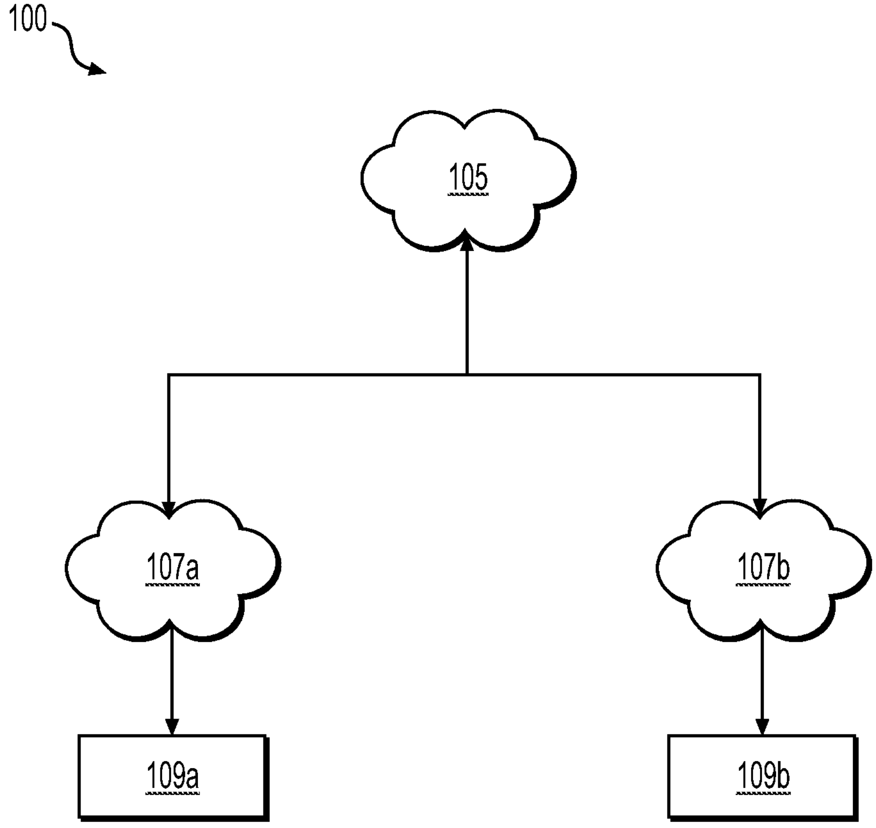
FIG. 1 depicts an exemplary system for distributed vehicle processing using a framework including one or more cloud nodes, fog nodes, and edge nodes, according to one or more embodiments.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Various embodiments of the present disclosure relate to systems and methods of an analytics framework to provide an intelligent software development kit (SDK) which will help users generate inferences from onboard avionics systems and other systems near or in communication with the data source, and aid in decision making (e.g., rule based and/or autonomous) using an end-to-end reference architecture for achieving various benefits around increased efficiency and safety in real-time Some limitations in existing cloud-based intelligence for onboard avionics applications may include: an aircraft produces a large amount of data for a long-haul flight (e.g., 45 TB of data); in a business and general aviation (BGA) segment, an aircraft will have less than 40% of continued internet up time between an end to end flight; the level B or C onboard avionics systems have deterministic computer power for advanced use cases; artificial intelligence (AI) applications in avionics are currently limited for post flight analytics over limited domain use cases around flight efficiency, maintenance, and safety; and, storage may be limited and expensive on onboard systems.

The above limitations may result in the following problems and/or disadvantages: costs involved in the lift and shift/storage of Aerospace Internet of Things (AIoT) onboard edge data to the cloud; taking real-time decisions closer to the data source onboard avionics systems for increased efficiency and safety; making better decisions when the aircraft is not connected to the cloud; facing the advent of AIoT and the proliferation of massive amounts of data through onboard avionics connected devices; availability of predictive and real-time intelligence for onboard avionics devices; adoption of edge analytics increases scalability and caters for a fault tolerant system with two tiers of processing; and seamless integration between intelligent cloud and intelligent edge.

One or more embodiments of the present disclosure provide systems and methods of a novel analytics fog-based framework to provide an intelligent SDK which will enable users to generate flight mission insights and/or inferences onboard the avionics systems near and/or in communication with the data source and aid in decision making (rule-based or autonomous) using an end-to-end reference architecture for achieving various benefits around increased efficiency and safety in real-time. One or more embodiments of the present disclosure may provide the following benefits and/or advantages: process device-generated data in real-time (e.g., filter, aggregate, rules, transformation, analyze, predict, detect anomalies); limit data sent to the cloud (e.g., aggregated data, anomalies); scalable solution that runs on different target platforms; improve performance requirements (e.g., data ingress, response time); and improve quality of service (e.g., manageability, upgradability, security).

In some aspects, being deployed as a framework has advantages of having the flexibility to be hosted on third party devices. The SDK methodology and approach also provide the ability for users to develop their own applications on the SDK, and to become a software service (of software-as-a-service, or "SaaS"), which can be monetized via license or subscription. One or more embodiments of the present disclosure provide a distributed computing system for aerospace that enables commercial technologies like artificial intelligence (AI), machine learning (ML), etc., to enable aerospace applications.

One or more embodiments of the present disclosure provide a SDK framework configured to manage different data sources (e.g., fusing data from separate data sources and creating corresponding data packets) to generate objects without impacting other resources. By minimizing the impact and handling data from separate data sources, the system and corresponding methods are "scalable". The scalable framework can be configured to process data from data sources while also permitting plug and play of SDKs without interrupting operations. This enables efficient scaling of the system where data sources may vary and incoming data are dynamic in nature. It not only helps in scalability and reducing the quantity of data but also ensures operational status and the quality of data being pushed to the cloud. For example, SDKs can detach and attach based on system need. In some aspects, the SDK framework of this disclosure, through which avionics application developers can build rapid applications, can operate with or on the onboard avionics subsystem data to generate various inferences in real-time in the cockpit.

In some aspects, the SDK framework of this disclosure offers various features including data ingestion from the avionics systems through MQ Telemetry Transport (MQTT) and real-time streaming, a rules engine, a time series database, a data pipeline for message exchange, and/or command and control. The SDK framework can be configured to allow avionics app developers to write time series analytics applications as well as re-use analytics models trained in the AIoT. The SDK also supports the execution of rules specified for the rules engine running as part of the AIoT analytics, with certain restrictions. The analytics framework SDK may support the execution of the one or more analytical models against live data stream in the target device platform, such as time series models; and rules and expression configured on a cloud server.

According to one or more embodiments, the SDK framework may support functionalities such as: the ability to register and configure the devices that are going to send data into an edge node; the ability to view, create, replace, update and delete rules in the server console; the ability to view the results/notifications from the edge analytics applications on the edge nodes; the ability to support MQTT, CoAP and similar messaging protocol communication with devices in order to ingest data; the ability to run a rules engine that executes rules written for the avionics rules engine running on an IoT platform as part of the real-time streaming analytics capability; the ability to support for basic functionality of an analytics engine as well as the ability to train an avionics model on the cloud and run it on the edge; an advanced capability of the SDK to support the runtime alone; the ability to process data from multiple real-time data streams; the ability to configure size complexity of the complex event processing (CEP) engine; writing analytics application(s) to process real-time data streams; and/or remotely monitoring the health of the solution, administer (e.g., start/stop) the solution and investigate/debug issues.

One or more embodiments of the present disclosure may provide the following benefits and/or advantages: provide for a framework for analytics for aerospace systems and sub systems where provisioned; easily deployable and maintainable analytics framework; provision for "model on the cloud" and "run on the edge" with all cyber considerations for airborne systems; provision for minimizing attack surface by ensuring that edge computing hardware, applications and data are as per the security assurance levels; provision for running aerospace applications on the framework envisioned; bring AI/ML into the cockpit to harness cockpit data and provide real-time insights; improve the situational awareness in flight deck while in a connected state or non-connected state; push data management, data governance and automation of data rich applications at the edge; help original equipment manufacturers (OEMs) and operators relook into their connectivity and data strategies for maximizing benefits and reducing costs; promote use of commercially available off-the-shelf (COTS) and open source for quicker turn around in this market space; and/or provision for scalable deployment solutions which can be orchestrated locally.

Figure 2:
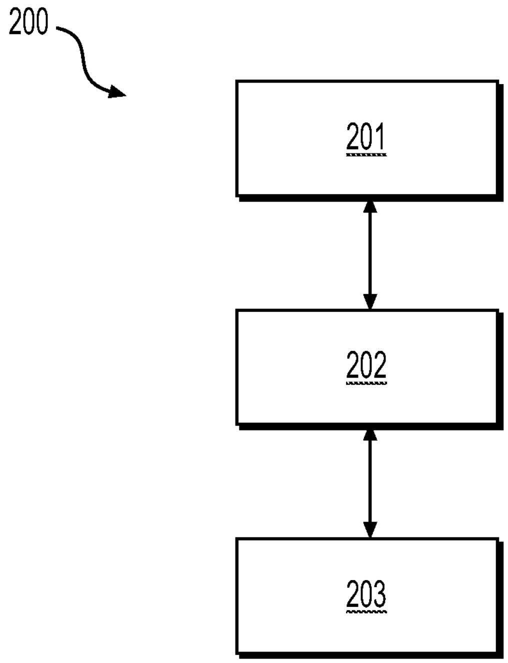
FIG. 2 depicts an exemplary layered view of an exemplary system for distributed vehicle processing using a framework including one or more cloud layers, fog layers, and edge layers, according to one or more embodiments.

FIG. 1 depicts an exemplary system 100 for distributed vehicle processing (e.g., avionics of an aircraft) using an application framework with one or more nodes of cloud, fog, and edge layers, according to one or more embodiments. FIG. 2 depicts a layered view of a similar computing system 200, without showing the nodes of FIG. 1. Specifically, FIG. 2 depicts system 200 including cloud layer 201 in communication with fog layer 202, which is in turn in communication with edge layer 203. It is understood that each layer 201, 202, and 203 of FIG. 2 can include any number of corresponding nodes in a distributed vehicle processing approach of one or more cloud, fog, and edge layers.

Turning back to FIG. 1, the system 100 can include one or more cloud nodes 105 in communication with a plurality of fog nodes 107*a*, 107*b*, etc. and corresponding edge nodes 109*a*, 109*b*, etc. to distribute vehicle processing to operate a vehicle (e.g., avionics of an aircraft). The methods and systems of the present disclosure may be particularly advantageous to enable partitioning and hosting avionics applications on low latency networks.

Fog nodes 107*a*, 107*b* can form aspects of a fog layer (e.g., layer 202) whereby implementation of the fog nodes 107*a*, 107*b* can act as an intermediate layer from local edge layers (e.g., layer 203) and the cloud layer (e.g., layer 201). Fog nodes 107*a*, 107*b* can be one or more functional nodes where each individual fog node does not have to implement the entire spectrum of capabilities. Instead, the fog capabilities may be distributed across multiple fog nodes 107*a*, 107*b* and systems, which may collaborate to help each other to provide the desired services. In some aspects, fog nodes 107*a*, 107*b* can be respective physical devices where fog computing is deployed and functions performed that might be otherwise performed at a server in cloud computing. Examples of functions that a fog node performs may be storage, communication, compute, control, decision making etc. With the fog layer of this example, the data processing can occur in fog nodes 107*a*, 107*b*, thus reducing the amount of data sent to cloud node 105. In other words, the fog layer with nodes 107*a*, 107*b* of FIG. 1 can include any number of virtualized services and/or data stores for a vehicle that are spread across the respective nodes. This may include a master-slave configuration, publish-subscribe configuration, or peer-to-peer configuration.

As shown in the example system 100 of FIG. 1, three illustrative layers are shown, namely a first layer with cloud node 105, a fog layer with fog nodes 107*a*, 107*b*, and edge layer with edge nodes 109*a*, 109*b*. Cloud node 105 can include general connectivity the internet with connectivity to datacenters and corresponding centralized servers or other devices. Fog nodes 107*a*, 107*b* can execute various fog computing processes and resources on networked edge nodes 109*a*, 109*b*, as opposed to cloud node 105. Data packets (e.g., traffic and/or messages sent between the devices/nodes) may be exchanged among the nodes of system 100 using predefined network communication protocols such as certain known wired protocols, wireless protocols, or other shared-media protocols where appropriate. In this context, a protocol can include of a set of rules defining how the nodes interact with each other.

By implementing vehicle applications on the edge nodes 109*a*, 109*b* with various in-operation subsystems (e.g., RADAR, Flight Management Systems, Engines, APU, Wheels & Breaks, etc.) and corresponding fog nodes 107*a*, 107*b* with a suite of application engines, vehicles may work offline with limited intelligence acquired from a respective cloud node 105 and be able to sync back the knowledge acquired when ground internet is available. As explained more particularly herein, this fog-based framework is capable of pulling all the necessary details when the corresponding vehicle is on-ground, while connected so that it may later run independently in an offline mode processing real-time vehicle data, generating vehicle operation insights (e.g., safety, efficiency, automation, etc.) throughout the respective vehicle operation (e.g., flight). In some aspects, real-time vehicle data and/or related operational insights can be pushed to a data lake in a cloud server (e.g., cloud node 105). In this respect, system 100 and other such systems of this disclosure can be useful for cross-referenced supplemental navigation in both offline and connected states with the cloud.

The network associated with system 100 of FIG. 1 may be any suitable network or combination of networks and may support any appropriate protocol suitable for communication of data to and from components of cloud node 105 and between various other components in the networked system 100 (e.g., components of the edge nodes 109*a*, 109*b* and/or fog nodes 107*a*, 107*b*). The network may include a public network (e.g., the Internet), a private network (e.g., a network within an organization), or a combination of public and/or private networks. The network may be configured to provide communication between various components depicted in FIG. 1. The network may be one or more networks that connect devices and/or components in the network layout to allow communication between the devices and/or components. For example, the network may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, the network may be implemented using cellular networks, satellite, licensed radio, or a combination of cellular, satellite, licensed radio, and/or unlicensed radio networks.

Advantageously, this framework allows for operations as between the fog layer 202 and edge layer 203 with limited intelligence acquired from the cloud (e.g., cloud layer 201) while being able to sync back knowledge acquired when network connectivity is available (e.g., when a vehicle such as an aircraft is on the ground at an airport). When network connectivity is available, then updates can occur, such as downloading the latest update to a vehicle before the next vehicle operation causes vehicle to be without connectivity once more (e.g., after take-off of an aircraft).

Figure 3A:
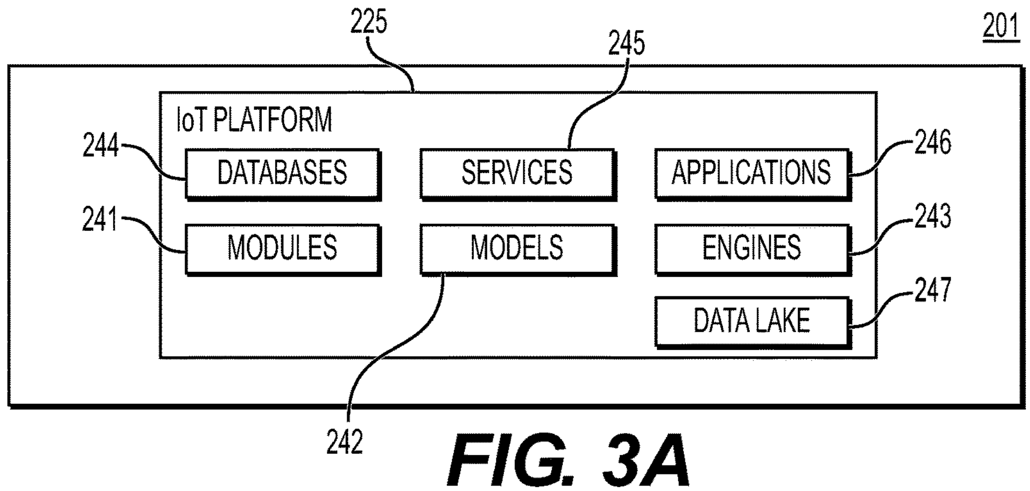
FIG. 3A illustrates an exemplary cloud layer of the system of FIG. 2.

Turning to FIG. 3A, a detailed view is provided of cloud layer 201 of FIG. 2. In some aspects, components of cloud layer 201 can include one or more computer systems that form an Internet-of-Things (IoT) platform 225. It should be appreciated that IoT platform may describe a platform connecting any type of Internet-connected device, and should not be construed as limiting the types of computing systems useable within IoT platform 225. In particular, computer systems of cloud layer 201 may include any type or quantity of one or more processors and one or more data storage devices comprising memory for storing and executing applications or software modules of networked computing system 200. In one embodiment, the processors and data storage devices are embodied in server-class hardware, such as enterprise-level servers. For example, the processors and data storage devices may comprise any type or combination of application servers, communication servers, web servers, super-computing servers, database servers, file servers, mail servers, proxy servers, and/virtual servers. Further, the one or more processors are configured to access the memory and execute processor-readable instructions, which when executed by the processors configures the processors to perform a plurality of functions of the networked computing system 200.

Computer systems of cloud layer 201 can include one or more software components of the IoT platform 225. For example, the software components of computer systems 220 may include one or more software modules to communicate with user devices and/or other computing devices. For example, the software components may include one or more modules 241, models 242, engines 243, databases 244, services 245, applications 246, and/or data lake 247, which may be stored in/by the computer systems of cloud layer 201 (e.g., stored on the memory). The one or more processors may be configured to utilize the one or more modules 241, models 242, engines 243, databases 244, services 245, applications 246, and/or data lakes 247 when performing various methods described in this disclosure.

Accordingly, computer systems of the cloud layer 201 may execute a cloud computing platform (e.g., IoT platform 225) with scalable resources for computation and/or data storage, and may run one or more applications on the cloud computing platform to perform various computer-implemented methods described in this disclosure. In some embodiments, some of the modules 241, models 242, engines 243, databases 244, services 245, applications 246, and/or data lakes 247 may be combined to form fewer modules, models, engines, databases, services, applications, and/or data lakes. In some embodiments, some of the modules 241, models 242, engines 243, databases 244, services 245, and/or applications 246 may be separated into separate, more numerous modules, models, engines, databases, services, and/or applications. In some embodiments, some of the modules 241, models 242, engines 243, databases 244, services 245, applications 246, and/or data lakes 247 may be removed while others may be added.

The computer systems of cloud layer 201 are configured to receive data from other components (e.g., components of the edge 215) of networked computing system 200 via network 210. Computer systems 220 are further configured to utilize the received data to produce a result. Information indicating the result may be transmitted to users via user computing devices over network 210. In some embodiments, the computer systems 220 may be referred to as a server system that provides one or more services including providing the information indicating the received data and/or the result(s) to the users. Computer systems 220 are part of an entity, which may include any type of company, organization, or institution that implements one or more IoT services. In some examples, the entity may be an IoT platform provider.

Figure 3B:
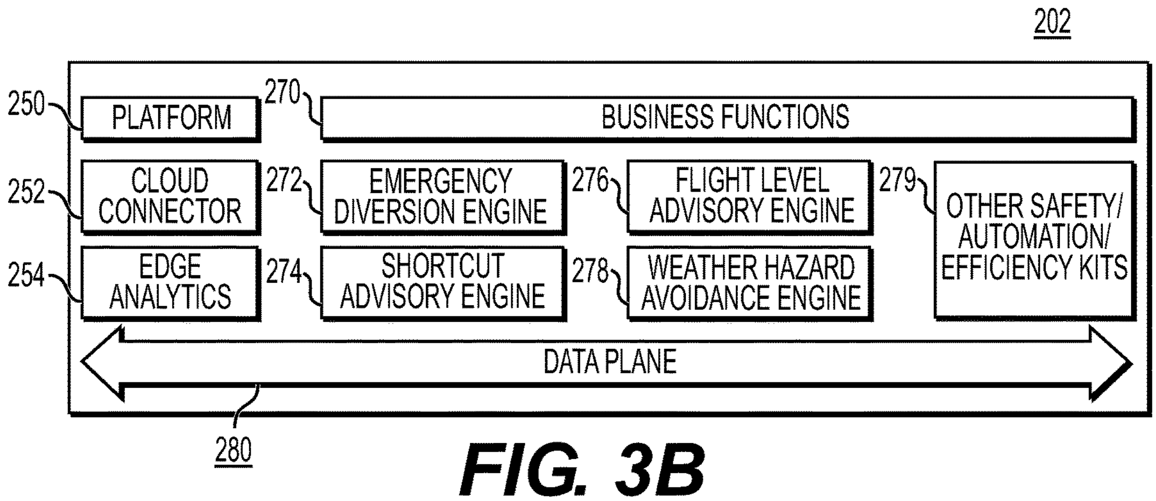
FIG. 3B illustrates an exemplary fog layer of the system of FIG. 2.

FIG. 3B illustrates a detailed view of fog layer 202 of FIG. 2. Fog layer 202 may include a fog platform 250, business functions 270 and data plane 280 for interfacing between cloud layer 201 and edge layer 203. Fog platform 250 can include cloud connector 252 and edge analytics 254. Business functions 270 can include one or more rules engines, including but not limited to emergency diversion engine 272, shortcut advisory engine 274, flight level advisory engine 276, weather hazard avoidance engine 278, as well as other engines (e.g., safety, automation, efficiency kids 279). Aspects of platform 250, business functions 270 and associated engines, as well as data plane 280 may be executed by one or more processors. Further, the one or more processors may be connected to a memory that may store the various instructions, rules, analytical models, and data from the various devices and sensors or data from the edge layer 203 and/or cloud layer 201.

For instance, edge analytics 254 can be configured to analyze data from edge layer 203. In some aspects, edge analytics 254 can handles all the data from edge layer 203 that needs to be stored temporarily/permanently and locally on edge layer 203, fog layer 202, and/or cloud layer 201. Cloud connector 252 can be the bridge that connects the fog nodes (e.g., 107*a*, 107*b*) of fog layer 202 with cloud nodes (e.g., 105) of cloud layer 201 in the cloud, by the one or more networks, when there is connectivity between cloud layer 201 and fog layer 202.

Figure 3C:
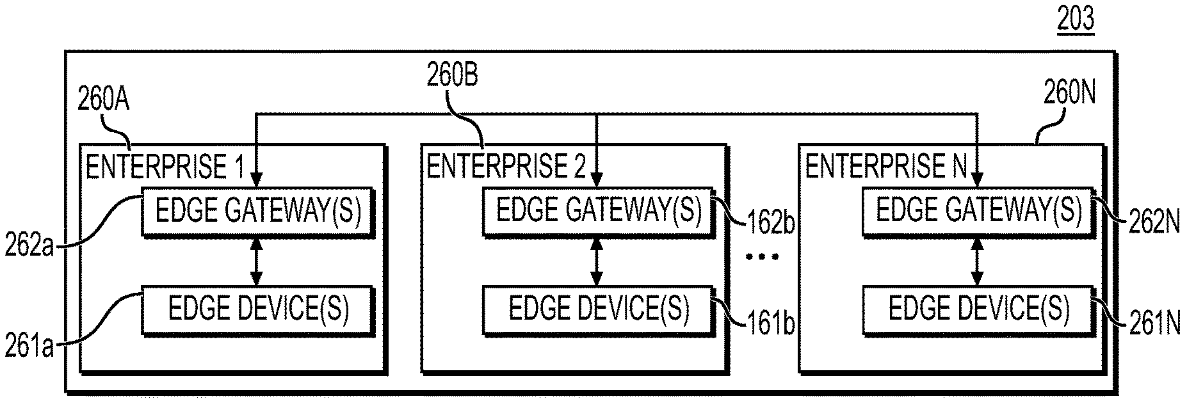
FIG. 3C illustrates an exemplary edge layer of the system of FIG. 2.

FIG. 3C illustrates an exemplary edge layer 203 of system 200. Components of the edge layer 203 can include one or more enterprises 260*a*-260*n* each including one or more edge devices 261*a*-261*n* and one or more edge gateways 262*a*-262*n*. For example, a first enterprise 260*a* includes first edge devices 261*a* and first edge gateways 262*a* (e.g., edge node), a second enterprise 260*b* includes second edge devices 261*b* and second edge gateways 262*b*, and an nth enterprise 260*n* includes nth edge devices 261*n* and nth edge gateways 262*n*. As used herein, enterprises 260*a*-260*n* may represent any type of entity, facility, or vehicle, such as, for example, companies, divisions, buildings, manufacturing plants, warehouses, real estate facilities, laboratories, aircraft, spacecraft, automobiles, ships, boats, military vehicles, oil and gas facilities, or any other type of entity, facility, and/or vehicle that includes any number of local devices.

The edge devices 261*a*-261*n* may represent any of a variety of different types of devices that may be found within the enterprises 260*a*-260*n*. Edge devices 261*a*-261*n* are any type of device configured to access the one or more networks associated with system 200, or be accessed at the local, vehicle level by other devices through fog layer 202, such as via an edge gateway 262*a*-262*n*. Edge devices 261*a*-261*n* may be referred to in some cases as "IoT devices," which may therefore include any type of network-connected (e.g., Internet-connected) device. For example, the edge devices 261*a*-261*n* may include sensors, actuators, processors, computers, valves, pumps, ducts, vehicle components, cameras, displays, doors, windows, security components, HVAC components, factory equipment, and/or any other devices that may be connected to for collecting, sending, and/or receiving information. Each edge device 261*a*-261*n* includes, or is otherwise in communication with, one or more controllers for selectively controlling a respective edge device 261*a*-261*n* and/or for sending/receiving information between the edge devices 261*a*-261*n* and the fog layer 202.

Edge layer 203 may also include operational technology (OT), systems information technology (IT) applications of each enterprise 161*a*-161*n*. The OT systems of edge layer 203 can include hardware and software for detecting and/or causing a change, through the direct monitoring and/or control of industrial equipment (e.g., edge devices 161*a*-161*n*), assets, processes, and/or events. The IT applications of edge layer 203 can include network, storage, and computing resources for the generation, management, storage, and delivery of data throughout and between organizations.

The edge gateways 262*a*-262*n* include devices for facilitating communication between the edge devices 261*a*-261*n* and the fog layer 202 and ultimately the cloud layer 201. For example, the edge gateways 262*a*-262*n* include one or more communication interfaces for communicating with the edge devices 261*a*-261*n* and for communicating with the fog layer 202. The communication interfaces of the edge gateways 262*a*-262*n* may include one or more cellular radios, Bluetooth, WiFi, near-field communication radios, Ethernet, or other appropriate communication devices for transmitting and receiving information. Multiple communication interfaces may be included in each gateway 262*a*-262*n* for providing multiple forms of communication between the edge devices 261*a*-261*n*, the gateways 262*a*-262*n*, and the fog layer 202. For example, communication may be achieved with the edge layer 203, including edge devices 261*a*-261*n*, and fog layer 202, and/or cloud layer 201 through wireless communication (e.g., WiFi, radio communication, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

The edge gateways 262*a*-262*n* may also include a processor and memory for storing and executing program instructions to facilitate data processing. For example, the edge gateways 262*a*-262*n* can be configured to receive data from the edge devices 261*a*-261*n* and process the data prior to sending the data to the fog layer 202. In some cases, any of edge devices 261*a-n* and edge gateways 262*a-n* may have their functionality combined, omitted, or separated into any combination of devices. In other words, an edge device and its connector and gateway need not necessarily be discrete devices.

In some aspects, the framework provided by system 200 is capable of pulling all the necessary details when a corresponding vehicle has internet connectivity between edge layer 203, fog layer 202, and cloud layer 201 while also being configured to operate edge layer 203 and fog layer 202 independently while in an offline mode processing real-time data from the edge devices 261*a*-261*n* (e.g., avionics data), generating vehicle operation insights with respect to safety, efficiency, automation, etc. throughout a vehicle operation (e.g., a flight) and pushing data and related insights to one or more data lake 247 of cloud layer 201 once connectivity is again available.

Figure 4:
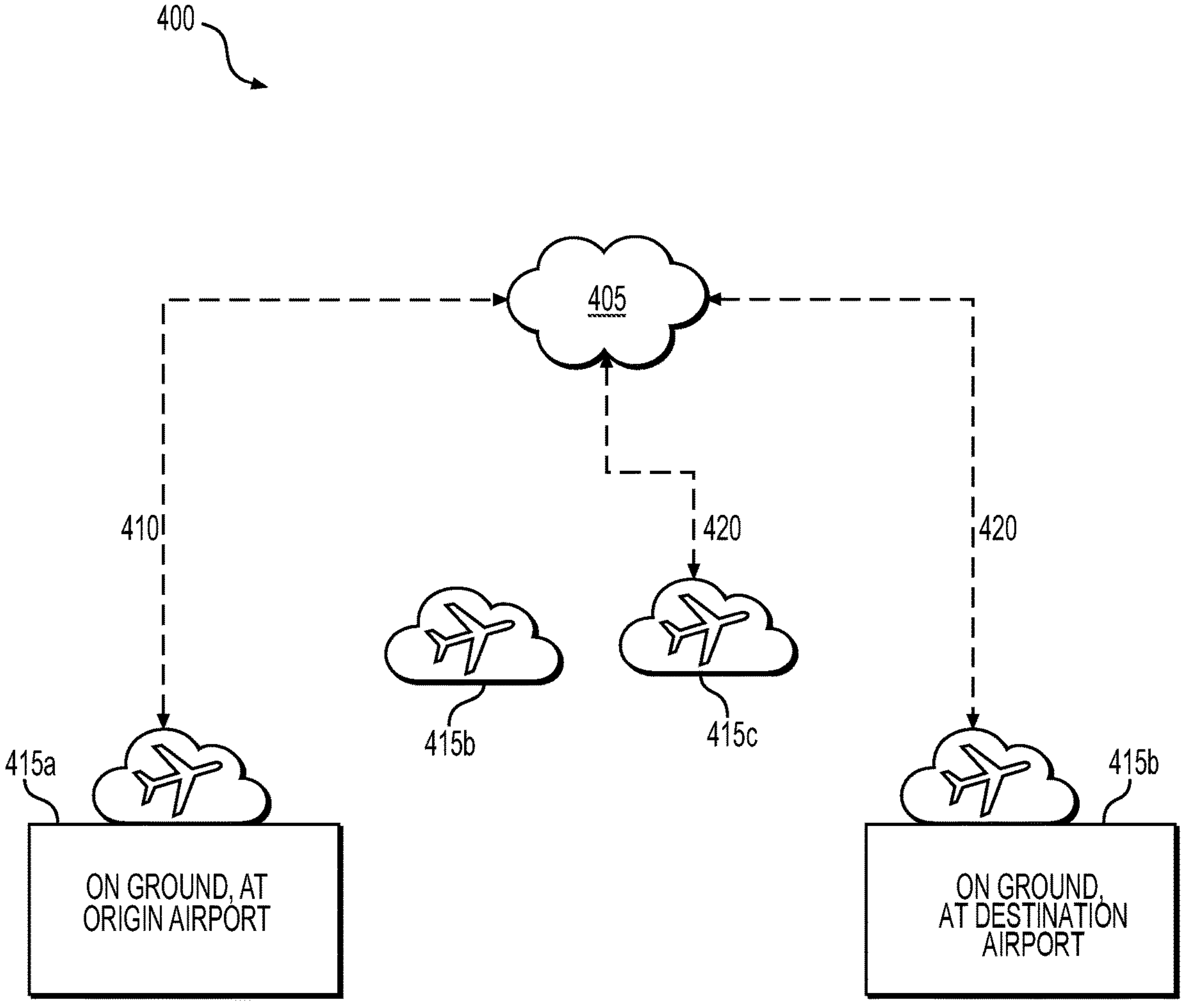
FIG. 4 depicts an example environment in which methods, systems, and other aspects of the present disclosure may be implemented.

FIG. 4 depicts an example environment 400 in which methods, systems, and other aspects of the present disclosure may be implemented. The environment of FIG. 4 may include aircraft 415*a*, 415*b*, 415*c*, 415*d* configured to communicate with cloud computing system 405 while on ground at an origin airport (415*a*) as well as on ground at a destination airport (415*d*). The term, "airport" can be a ground facility where aircraft may take off, land, or remain parked. The environment of FIG. 4 can accommodate aircraft of various types flying at various altitudes and via various routes.

In some aspects, while on ground at the origin airport, aircraft 415*a* can be configured to perform operations 410 which can include pulling data from the cloud computing system 405. Such data can include information from a shortcut database, a navigation database, historical flight data and associated shortened flight routes, any other databases, and information from the latest SDK engines. In some aspects, SDKs can contain all the connectivity to external devices and any other content that can be shared across applications, such as hosted SDKs for avionics and/or flight management such as Flight Management Systems, Enhanced Ground Proximity Warning System (EGPWS), Traffic Collision Avoidance System TCAS, Weather or RADAR Systems, electronic flight bag (EFB) devices, wheels, connected FMS library, speech models, gateway connector libraries, etc. It is understood that these hosted SDKs can be software entities which can be included to generically manage interfaces and connections, provide access to engines, and host other shareable features. In some aspects, while in flight between origination and destination, aircraft 415*b* may be without connectivity to cloud computing system 405. In spite of not being connected to cloud computing system 405, however, the fog computing framework of aircraft 415*b* can still handle vehicle operations and determining related vehicle operation insights, such as for example onboard analytics safety advisories (e.g., the most safe and/or optimal flight trajectory of aircraft 415*b*), onboard analytics efficiency advisories, as well as storing all key flight events (e.g., a flight event that includes one or more system identified flight operation anomaly).

In some aspects, while in flight between origination and destination, aircraft 415*c* may be configured to perform operations 420 with connectivity to cloud computing system 405. In this respect, operations 420 cab include the fog computing framework of aircraft 415*c* being in an online, connected state with respect to cloud computing system 405 whereby the fog computing framework can transmit all key flight events that may have been previously stored when disconnected from cloud computing system 405 during flight (e.g., the offline state associated with aircraft 415*b*). In some aspects, while on ground at the destination airport, aircraft 415*d* can be configured to perform operations 420 which can include pushing data from aircraft 415*d* to the cloud computing system 405. Such data can include flight data and related operational insights.

Figure 5:
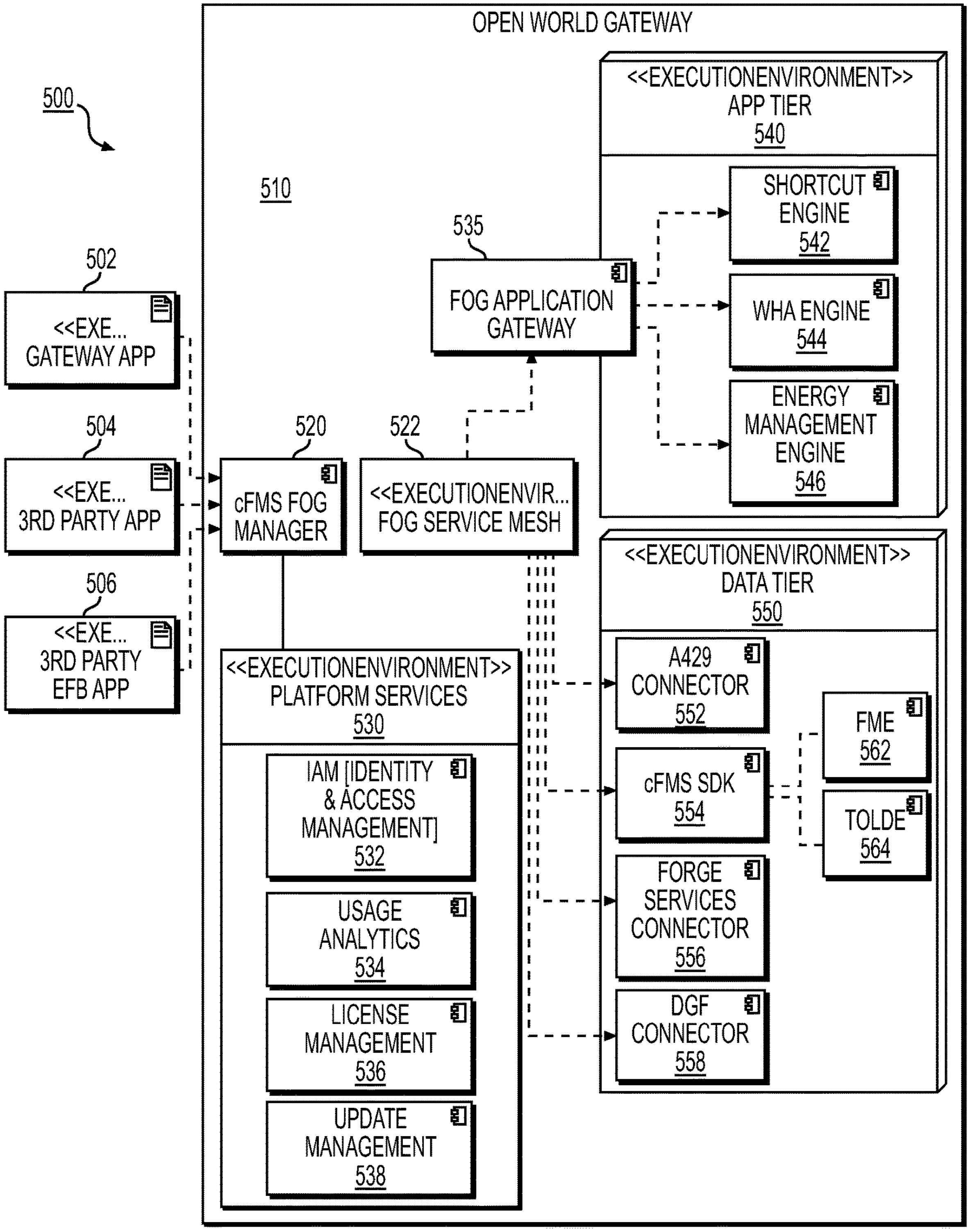
FIG. 5 depicts a block diagram schematically showing example architecture of a fog-based application service framework, according to one or more embodiments.

FIG. 5 depicts a block diagram schematically showing example architecture of a fog-based application service framework 500 for use in operating a vehicle, according to one or more embodiments. In the depicted example, the contemplated vehicle is an aircraft, though other vehicles and related operations are contemplated for use with framework 500. As shown, framework 500 may include an open gateway 510, which can include a connected flight management software fog manager 520 in communication with a fog service mesh 522, platform services 530, as well as third party apps, such as gateway app 502, third party apps 504, and third party electronic flight bag apps 506. In some implementations, the framework 500 may correspond to an FMS fog based system, with gateway 510 allowing communications between respective layers of a multi-layered system (e.g., a system with one or more cloud, fog, and edge layers). Components, devices, and modules of framework 500 may interconnect via wired connections, wireless connections, or a combination of wired and wireless connections.

Manager 520 may be configured to manage all requests from external applications and maintain a queue, and/or be responsible for processing the requests. Depending upon various use cases, manager 520 may be configured to accommodate requests or communications (e.g., requests from on-board flight management systems of the vehicle, EFB applications such as apps 506, or dispatcher devices such as apps 504), invoke multiple edge and fog services and aggregate and/or coordinate the results. Manager 520 may be, for example, configured to be updated each time a new micro-service is added or removed in connected FMS micro-services of the edge (e.g., one or more components of edge layer 203). Manager 520 may be implemented as hardware, software, and/or a combination of hardware and software.

In some aspects, manager 520 can be a component which may serve as a point of entry for micro-services of framework 500, such as fog service mesh 522, the connected platform services 530, data tier 550 and/or the fog application gateway 535 of app tier 540. Fog service mesh 522 can act as a bridge between data 550 and app 540 tiers. In some aspects, gateway 535 can be configured to segregate the incoming requests from mesh 522 by way of manager 520 and route the requests to business logic components of tier 540, such as shortcut engine 542, weather hazard and energy management engines 546.

In some aspects, data tier 550 can include components to connect with various vehicle subsystems, such as avionics subsystems including flight management systems (FMS), engines, APUs and can pull the real time device data to manager 520 via mesh 522 for further analytics. It is understood that "an engine" as used herein can be a self-contained piece of business functionality with interfaces contained within a hosted framework. By way of example and without limitation, engines of data tier 550 can be configured for vehicle management with flight management system SDK 554, such as Flight Management Engine (FME) 562, Takeoff and Landing Engine (TOLDE) 564, a Navigation Database Engine, as well as higher order content as a flight plan comparator utility. Data tier 550 can also include connector 552, FORGE service connectors 556, and DGF connector 558.

App tier 540 in some aspects contains engines, such as engines 542, 544, 546, to perform real time analytics and provide real-time vehicle operation insights, such as advisories to a user (e.g., pilot). Such advisories can be vehicle operation insights such as fuel efficiency opportunity on the flight path or it could be safety related to perform re-routing to avoid adverse weather or for emergency landing scenarios. In some aspects, platform connected services 530 can include identify and access management (IAM) engines 532, usage analytics engines 534, license management engines 536, and update management engines 538.

FMS services of framework 500 can be organized as a collection of specialized modular services. In some implementations, the connected FMS micro-services may be software applications stored, at least in part, in one or more aspects of the corresponding fog layer. The connected FMS micro-services of framework 500 may be modular services which are developed, deployed, and scaled independently of each other, messaging-enabled to communicate with various components within the framework 500, and organized around capabilities. Such services may include, for example, flight planning services, in-flight navigation services, airport specific services, ground communication services, weather services, services for computing fuel scenarios, services for computing optimization scenarios, services for offsetting deviations, and services for computing approach procedures. The connected FMS micro-services of framework 500 may be implemented as hardware, software, and/or a combination of hardware and software.

A prediction engine (not shown) may be included (e.g., with app tier 540) and configured to predict FMS services which are required for specific contexts, or predict data which may be necessary for an FMS service(s) or an operation of another servicing module(s). Predictions provided by the prediction engine may be used for various use cases in the framework 500. The prediction engine may be implemented as hardware, software, and/or a combination of hardware and software.

The prediction engine may include machine learning applications. In some implementations, output(s) from one or more of the included machine learning applications may become input(s) for different one or more of the machine learning applications to arrive at inference or prediction results. The prediction engine may, for example, be trained on a training set (e.g., FMS micro-services that have been called under certain contexts) in order to analyze the FMS micro-services being correlated with certain contexts, generate a score for contexts representing a similarity to a given context, and select one or more FMS micro-services associated with contexts over a threshold score. In some implementations, the prediction engine may analyze prior predictions, to the extent obtainable from framework 500 and/or other systems, to train and determine predictions of FMS services which are required for specific contexts, or data predicted to be necessary.

Figure 6:
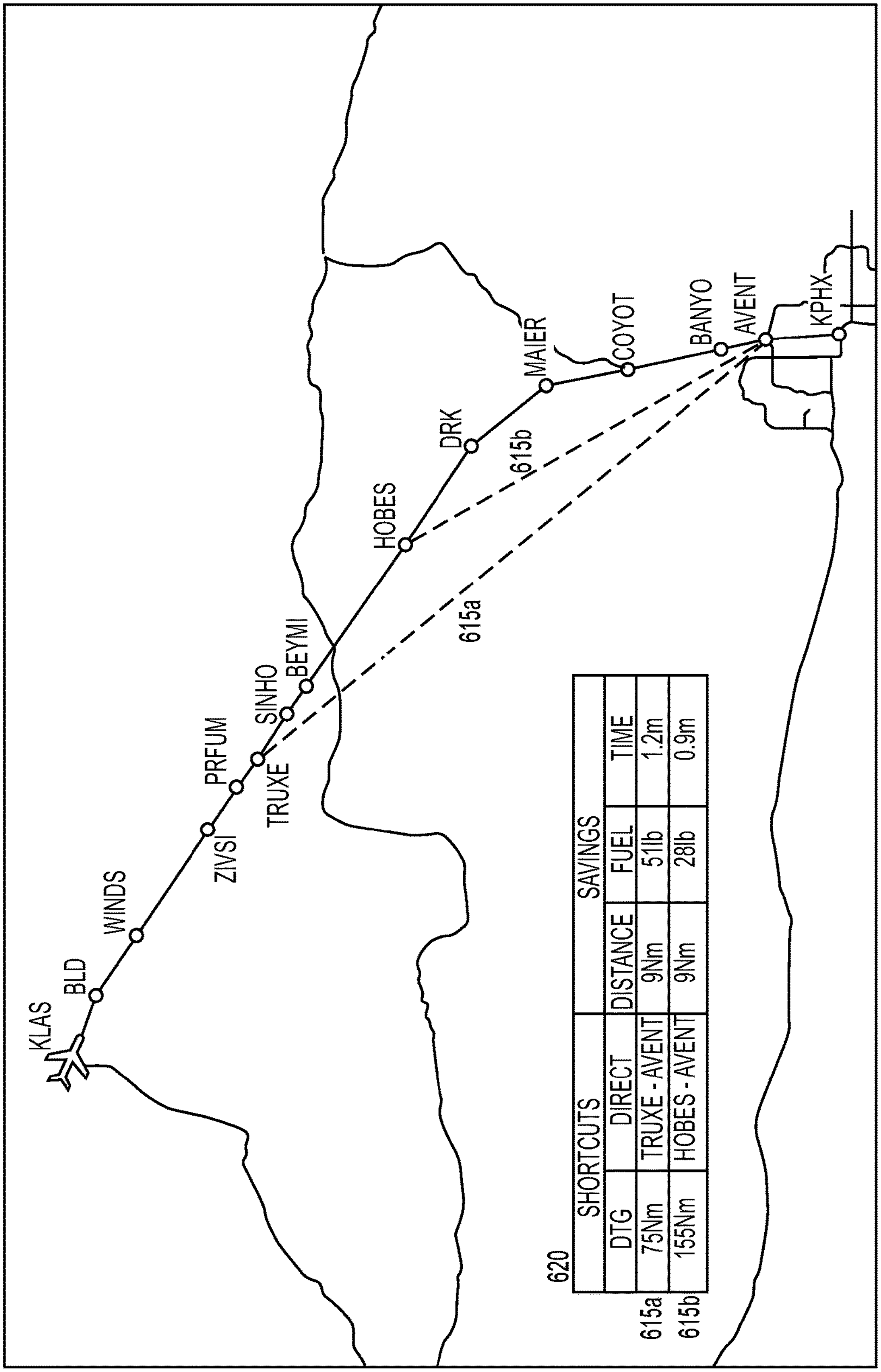
FIG. 6 shows a schematic user interface of a real-time shortcut advisory system for vehicle operation modification, in accordance with various embodiments.

FIG. 6 shows a schematic user interface 610 of a real-time shortcut advisory system for vehicle operation modification, in accordance with various embodiments. In practice, flight plans associated with aircraft flight operations can be generated along with the published flightpaths. However, such flight plans do not necessarily represent a shortest, safest, and/or most efficient track between points (e.g., between origin and destination airports). By using the herein disclosed fog-based framework and methods, one or more shortcut opportunities 615*a*, 615*b* can be determined and presented to a user on a lateral navigation map overlaid with the initial flight plan while the aircraft is flying along a flight path based on historical flight data and any associated air traffic controller information. In some aspects, the historical flight data can be validated by any herein disclosed fog-based framework against current weather conditions to increase the probability of clearance by an air traffic controller.

For example, the fog-based framework of FIG. 6 can determine shortcut opportunities 615*a*, 615*b*, as between certain waypoints of a respective flight path. Information related to the respective shortcut opportunities 615*a*, 615*b* can be presented in shortcut summary 620. Summary 620 can include information related to respective shortcut opportunities 615*a*, 615*b*, such as waypoint information and vehicle operation savings (e.g., shortened distance, saved fuel, saved flight time, etc.). In some aspects, shortcut opportunities 615*a*, 615*b* can be provided to a user (e.g., the pilot), a predetermined amount of time (e.g., 10 min) prior to a respective waypoint of a flight path to ensure applicability and adherence to the related advisories. Advantageously, the one or more shortcut opportunities 615*a*, 615*b* can be determined by the fog-based framework and methods without requiring connectivity to the cloud.

In some aspects, the fog-based framework of FIG. 6 can be configured to pull current active flight plans from aircraft avionics (e.g., from the flight management system) and analyze corresponding flight plan data for one or more shortcut opportunities using stored backend database historical flight data. In some aspects, the fog-based framework of FIG. 6 can be configured to pull weather information from avionics (e.g., from a RADAR subsystem) to ensure proposed shortcut opportunities do not overlap with any weather hazard zones. In some aspects, the fog-based framework of FIG. 6 can be configured to pull live aircraft position periodically to check proximity to an identified shortcut and notify a user (e.g., the pilot) through one or more offboard apps to start negotiating with air traffic control to avail of the one or more shortcut opportunities. In some aspects, the fog-based framework of FIG. 6 can be configured to pull the latest flight plan upon any re-routing decision taken and re-evaluate shortcuts. In some aspects, the fog-based framework of FIG. 6 can be configured to store all the key flight events, shortcuts proposed, availed, and/or cancelled information in the fog-based framework when there is no connectivity to the external cloud.

FIG. 7 is a table summarizing example operational scenarios of an exemplary fog-based framework of this disclosure. Specifically, FIG. 7 describes operational scenarios for a plurality of aircraft connection states when the system is connected and disconnected from the cloud.

For example, in a connective-active sync state, the system is able to perform one or more computations with respect to information received from the cloud. In some aspects, the one or more computations can include analyzing data from all available live data feeds from sources such as NOTAM, WXR, DATIS, and other flight information databases. In the connective-active sync state, the fog layer of the fog-based framework can receive one or more live advisories from the cloud with respect to vehicle operations (e.g., based on information from cloud-based databases and any corresponding machine learning models).

In a connective-active store data state of FIG. 7, the system is able to store vehicle operation data received from the cloud for later usage (e.g., during flight when the fog-based framework may be disconnected with the cloud). In some aspects, the stored vehicle operation data can be used for vehicle operation insight determination during flight. In the connective-active store data state, the fog layer of the fog-based framework can store and/or buffer data (e.g., weather related information, alternate airports for a flight plan, etc.) for later use in case of connectivity loss from the cloud.

In a disconnected data state of FIG. 7, the system is disconnected from the cloud but still able to analyze vehicle operation data previously received from the cloud. In some aspects of the disconnected data state, the fog layer of the fog-based framework is configured to perform scaled down computations with respect to determine vehicle operation states and/or flight operation insights (e.g., alternate emergency diversion paths, etc.).

Figure 8:
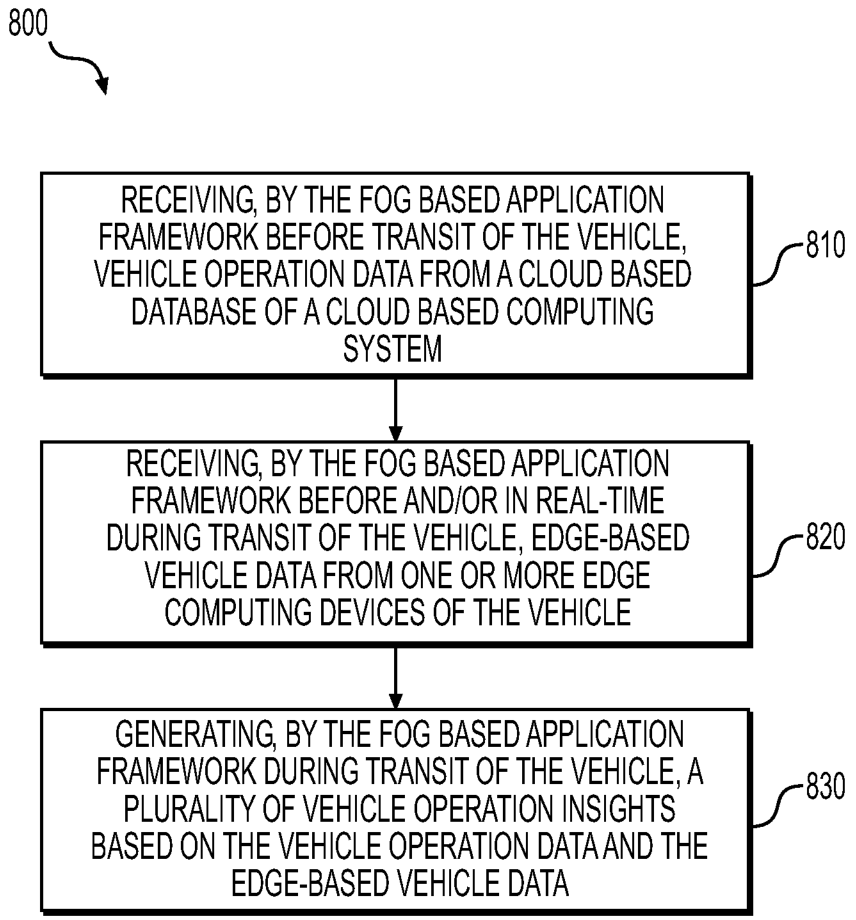
FIG. 8 depicts an exemplary diagram of a data flow of using a computing system with a fog based application framework, according to one or more embodiments.

FIG. 8 depicts a flowchart for a method 800 of using any of the embodiments of an integrated networked computing system. The method may include performing, by one or more processors, operations including step 810 of receiving, by the fog based application framework before transit of the vehicle, vehicle operation data from a cloud based database of a cloud based computing system. Step 820 of the operations may include receiving, by the fog based application framework before and/or in real-time during transit of the vehicle, edge-based vehicle data from one or more edge computing devices of the vehicle. Step 820 of the operations may include generating, by the fog based application framework during transit of the vehicle, a plurality of vehicle operation insights based on the vehicle operation data and the edge-based vehicle data.

Figure 9:
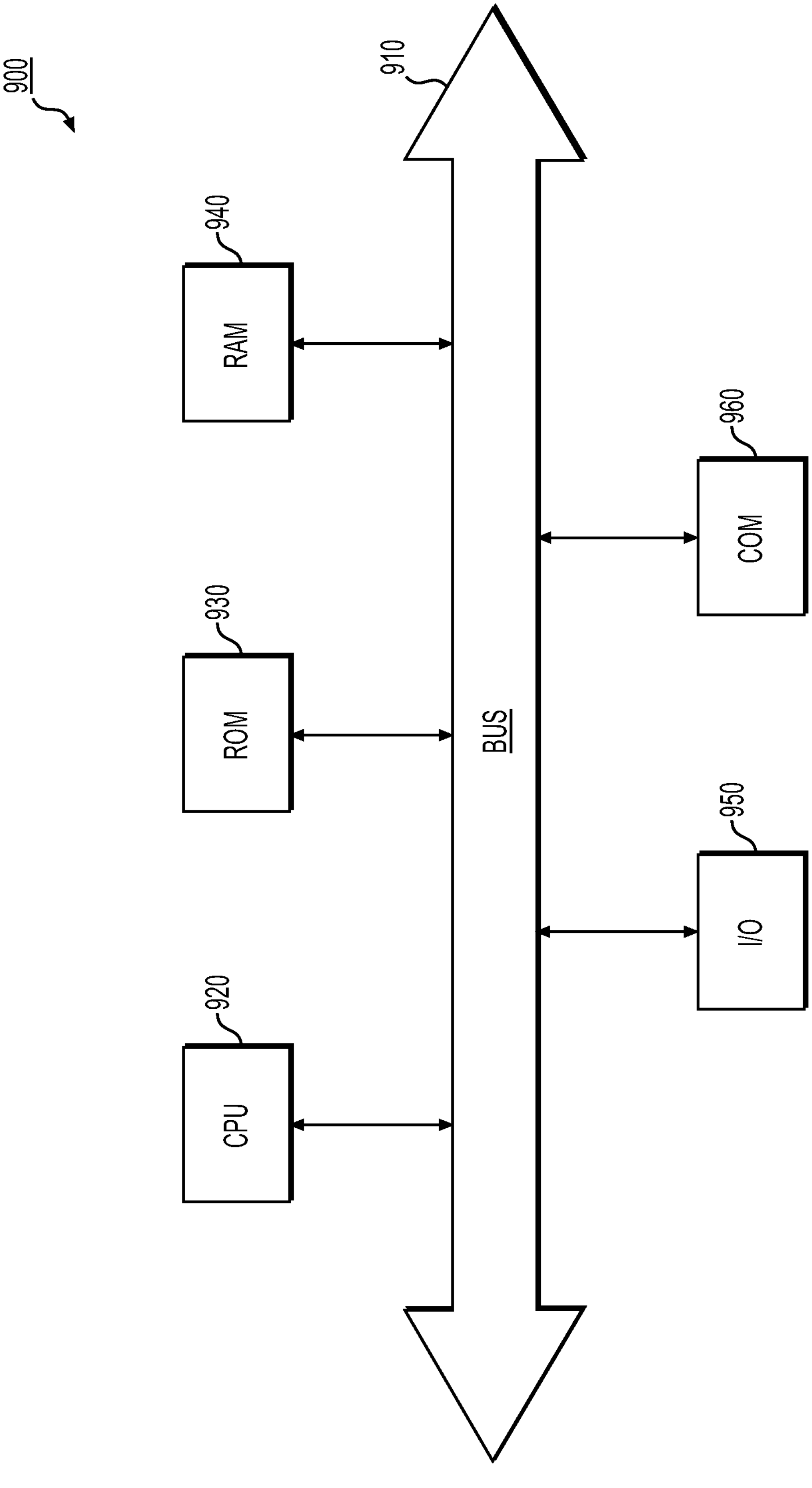
FIG. 9 depicts an example system that may execute techniques presented herein.

FIG. 9 depicts an example system 900 that may execute techniques presented herein. FIG. 9 is a simplified functional block diagram of a computer that may be configured to execute techniques described herein, according to exemplary embodiments of the present disclosure. Specifically, the computer (or "platform" as it may not be a single physical computer infrastructure) may include a data communication interface 960 for packet data communication. The platform also may include a central processing unit ("CPU") 920, in the form of one or more processors, for executing program instructions. The platform may include an internal communication bus 910, and the platform also may include a program storage and/or a data storage for various data files to be processed and/or communicated by the platform such as ROM 930 and RAM 940, although the system 900 may receive programming and data via network communications. The system 900 also may include input and output ports 950 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

Predictive maintenance includes predictive analytics models developed based on rigorous models and statistic models, such as, for example, principal component analysis (PCA) and partial least square (PLS). Machine learning methods can be applied to train models for fault prediction. Predictive maintenance can leverage FDD-based algorithms to continuously monitor individual control and equipment performance. Predictive modeling is then applied to a selected condition indicator that deteriorates in time. Prescriptive maintenance includes determining what the best maintenance option may be and when it should be performed based on actual conditions rather than time-based maintenance schedule. Prescriptive analysis can select the right solution based on the company's capital, operational, and/or other requirements. Process optimization is determining optimal conditions via adjusting set-points and schedules. The optimized set-points and schedules can be communicated directly to the underlying controllers, which enables automated closing of the loop from analytics to control.

One or more embodiments of the present disclosure address the above problems and are able to provide scalable, reliable real-time decision support systems by developing a method for providing inflight analytics. The present disclosure describes at least one method of a customizable rules engine which may be processed during the flight for applications related to flight safety, efficiency and maintenance.

The herein disclosed computing methods may include, but are not limited to, statistical analysis, autonomous or machine learning, and AI. AI may include, but is not limited to, deep learning, neural networks, classifications, clustering, and regression algorithms. By using such computational methods, flight insights and related predictions as to safety and flight operation management may be achieved by helping users (e.g., flight crew) improve their inflight operation insight accuracy, reliability, efficiency, and accessibility. For example, such computational methods may be used to assist with detecting or otherwise predicting flight operation events or trends, thereby allowing end users to check and confirm with respect to current flight operations in real-time before rendering a corrective action. In particular, embodiments disclosed herein may use weak supervision, in which a deep learning model may be trained directly from avionics data sources as well as flight operation data. A machine learning or deep learning model may include a machine learning algorithm, in some embodiments. This enables systems to be trained directly from diagnostic reports or test results without the need for extensive annotations. This is particularly advantageous since the herein disclosed system provides for real-time scenario modelling, insight presentation, and live feedback on regarding statistical insights. With the integrated flight deck (IFD), the data acquisition as well as analytics also can be real-time and will not have to rely on third party data that can only be retrieved post flight and has limited data for analysis.

The herein disclosed systems and methods are advantageous to provide all content within a single application to enable synergies across multiple applications and thus make them more usable (e.g., as an integrated flight deck application platform that unifies cockpit interface management). In so doing, the IFD is configured to bridges previously known problems by providing an end-to-end real-time data acquisition as well as a presentation platform for inflight operation insights (e.g., fuel efficiency insights). With the herein disclosed IFD, KPIs can be generated inflight and in real-time rather than post-flight.

For example, real-time flight data from the IFD can be used to quickly assess the flight parameter (e.g., a flight situation) and provide instant feedback to users (e.g., flight crew) as to flight efficiency related operations. In some aspects, the IFD can be configured with a flight level advisory system that provides potential cost-efficient flight levels based on historical flights. The IFD, having real-time access to data pertaining to flight mission(s) and state(s), evaluates insights against the current conditions and presents the most appropriate insights to the GUI of the IFD on its interface to corresponding users (e.g., flight crew). The herein disclosed systems and methods are advantageous to transform traditional expensive avionics functions deployment lifecycles with faster and inexpensive paths provided by a certified cFMS environment.

The herein disclosed systems and methods are advantageous for subscription-based solutions to be quickly integrated into applications developed using this technology. For example, the herein disclosed systems and methods provide a framework that enables a common look and feel, common behavior, and simplified user experience across a suite of hosted applications. This user interface content of the herein disclosed systems and methods can be configurable to be changed from one user to another without impacting the application logic.

The herein disclosed systems and methods are also advantageous for providing a framework which provides a fog-based computing system with an umbrella framework that is accessible by users (e.g., in an app store) and once installed enables the use of additional hosted apps. In some aspects, this framework advantageously enables a common and simplified API infrastructure to build a suite of hosted applications.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

In this disclosure, relative terms, such as, for example, "about," "substantially," "generally," and "approximately" are used to indicate a possible variation of ±10% in a stated value.

The term "exemplary" is used in the sense of "example" rather than "ideal." "One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms “a”, “an” and “the” are intended to include the plural forms as well, unless the context clearly indicates otherwise. It will also be understood that the term “and/or” as used herein refers to and encompasses any and all possible combinations of one or more of the associated listed items. It will be further understood that the terms “includes,” “including,” “comprises,” and/or “comprising,” when used in this specification, specify the presence of stated features, integers, steps, operations, elements, and/or components, but do not preclude the presence or addition of one or more other features, integers, steps, operations, elements, components, and/or groups thereof.

As used herein, the term “if” is, optionally, construed to mean “when” or “upon” or “in response to determining” or “in response to detecting,” depending on the context. Similarly, the phrase “if it is determined” or “if [a stated condition or event] is detected” is, optionally, construed to mean “upon determining” or “in response to determining” or “upon detecting [the stated condition or event]” or “in response to detecting [the stated condition or event],” depending on the context.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of using an integrated networked computing system comprising a fog based application framework comprising a plurality of application and data engines/edge services and a software development kit (SDK) framework, the method comprising:

performing, by one or more processors, operations including:

receiving, by the fog based application framework before transit of a vehicle, vehicle operation data from a cloud based database of a cloud based computing system;

receiving, by the fog based application framework before and/or in real-time during transit of the vehicle, edge-based vehicle data from one or more edge computing devices of the vehicle;

generating, by the fog based application framework during transit of the vehicle, a plurality of vehicle operation insights based on the vehicle operation data and the edge-based vehicle data;

managing, by a fog based manager of the fog based application framework, all requests from one or more third party applications external to the fog based application framework;

using a fog service mesh as a bridge between the fog based manager and a data tier and/or an application tier, wherein the application tier comprises a fog application gateway in communication with one or more data operation engines;

segregating, by the fog service mesh, vehicle operation requests and routing the segregated vehicle operation requests to the one or more data operation engines; and executing, by the fog based application framework, one or more control commands to modify one or more operations of the vehicle based on the plurality of operational insights.

2. The method of claim 1, wherein the one or more operations of the vehicle comprise an estimated time and/or an estimated efficient flight path of the vehicle to a destination.

3. The method of claim 1, further comprising:

generating, after completion of a first operation associated with vehicle transit, a vehicle operation update related to a second operation of vehicle transit.

4. The method of claim 1, wherein the plurality of vehicle operation insights comprise one or more safety insights, efficiency insights, and/or vehicle operation automation insights.

5. The method of claim 1, wherein the step of generating, by the fog based application framework during transit of the vehicle, the plurality of vehicle operation insights is performed when disconnected from the cloud based database, the method further comprising:

upon establishing connectivity between the fog based application framework and the cloud based database, pushing, by the fog based application framework, vehicle operation data and/or the plurality of vehicle operation insights to a data lake of the cloud based computing system.

6. The method of claim 1, wherein the vehicle is an aircraft and transit is performed during flight operations.

7. The method of claim 1, further comprising: connecting the data tier with a plurality of vehicle subsystems of the one or more edge computing devices; and pulling real time data to the fog based manager of the fog based application framework to generate vehicle operation insights.

8. The method of claim 1, further comprising:

receiving, during an active sync mode between the fog based application framework and the cloud based computing system, a plurality of vehicle operation advisories from the cloud based computing system.

9. The method of claim 8, wherein the vehicle operation advisories are determined using a machine learning model of the cloud based computing system, the vehicle operation advisories comprising for one or more fault conditions, event conditions, and/or anomalies of flight operations, the machine learning model having been generated by processing the edge-based vehicle data.

10. The method of claim 1, further comprising: storing, in an edge database of the fog based application framework, a plurality of vehicle operation advisories received, during a store data connected mode from the cloud-based computing system, the plurality of vehicle operation advisories being configured for future vehicle operations in case of vehicle losing connectivity with the cloud based computing system.

11. The method of claim 10, the method comprising: causing, by the fog based application framework, updated vehicle operations based on the plurality of vehicle operation advisories during connectivity loss with the cloud based computing system.

12. The method of claim 1, wherein during a disconnected offline mode, the step of generating, by the fog based application framework in the edge during transit of the vehicle, the plurality of vehicle operation insights is based on the edge-based vehicle data comprising onboard safety analytics, efficiency advisories, the method further comprising identifying and storing all operation events comprising one or more anomalies.

13. A system for optimizing operations of a vehicle, comprising:

a memory storing instructions; and one or more processors and configured to execute the stored instructions to perform operations of the vehicle, the operations including:

receiving, by a fog based application framework in the edge before transit of the vehicle, vehicle operation data from a cloud based database of a cloud based computing system;

receiving, by the fog based application framework before and/or in real-time during transit of the vehicle, edge-based vehicle data from one or more edge computing devices of the vehicle;

generating, by the fog based application framework during transit of the vehicle, a plurality of vehicle operation insights based on the vehicle operation data and the edge-based vehicle data;

managing, by a fog based manager of the fog based application framework, all requests from one or more third party applications external to the fog based application framework;

using a fog service mesh as a bridge between the fog based manager and a data tier and/or an application tier, wherein the application tier comprises a fog application gateway in communication with one or more data operation engines;

segregating, by the fog service mesh, vehicle operation requests and routing the segregated vehicle operation requests to the one or more data operation engines; and executing, by the fog based application framework, one or more control commands to modify one or more operations of the vehicle based on the plurality of operational insights.

14. The system of claim 13, wherein the operations further comprise: wherein the step of generating, by the fog based application framework during transit of the vehicle, the plurality of vehicle operation insights is performed when disconnected from the cloud based database, the method further comprising: upon establishing connectivity between the fog based application framework and the cloud based database, pushing, by the fog based application framework, vehicle operation data and/or the plurality of vehicle operation insights to a data lake of the cloud based computing system.

15. The system of claim 13, wherein the operations further comprise:

connecting the data tier with a plurality of avionics subsystems; and pulling real time data to the fog based manager of the fog based application framework to generate vehicle operation insights.

16. A non-transitory computer-readable medium storing instructions, that when executed by at least one processor, perform a method for optimizing one or more vehicle operations of a vehicle, the method comprising:

receiving, by a fog based application framework before transit of the vehicle, vehicle operation data from a cloud based database of a cloud based computing system;

receiving, by the fog based application framework before and/or in real-time during transit of the vehicle, edge-based vehicle data from one or more edge computing devices of the vehicle;

generating, by the fog based application framework during transit of the vehicle, a plurality of vehicle operation insights based on the vehicle operation data and the edge-based vehicle data;

managing, by a fog based manager of the fog based application framework, all requests from one or more third party applications external to the fog based application framework;

using a fog service mesh as a bridge between the fog based manager and a data tier and/or an application tier, wherein the application tier comprises a fog application gateway in communication with one or more data operation engines;

segregating, by the fog service mesh, vehicle operation requests and routing the segregated vehicle operation requests to the one or more data operation engines; and executing, by the fog based application framework, one or more control commands to modify one or more operations of the vehicle based on the plurality of operational insights.

17. The non-transitory computer-readable medium of claim 16, wherein the method comprises:

pulling a plurality of configuration files related to vehicle operations before leaving an origin when the fog based application framework is connected to the cloud based computing system;

pulling a vehicle operation plan from the one or more edge computing devices of the vehicle;

assessing the vehicle operation plan for one or more shortcut opportunities; and determining whether any of the one or more shortcut opportunities conflict with detected environmental information from the one or more edge computing devices and/or the cloud based computing system.

* * * * *